Aug. 4, 1925.

J. GLANG

DISPLAY DEVICE

Filed Feb. 16, 1921

INVENTOR.
JOHN GLANG.
BY Chas E. Townsend
ATTORNEY

INVENTOR.
JOHN GLANG.
BY
ATTORNEY

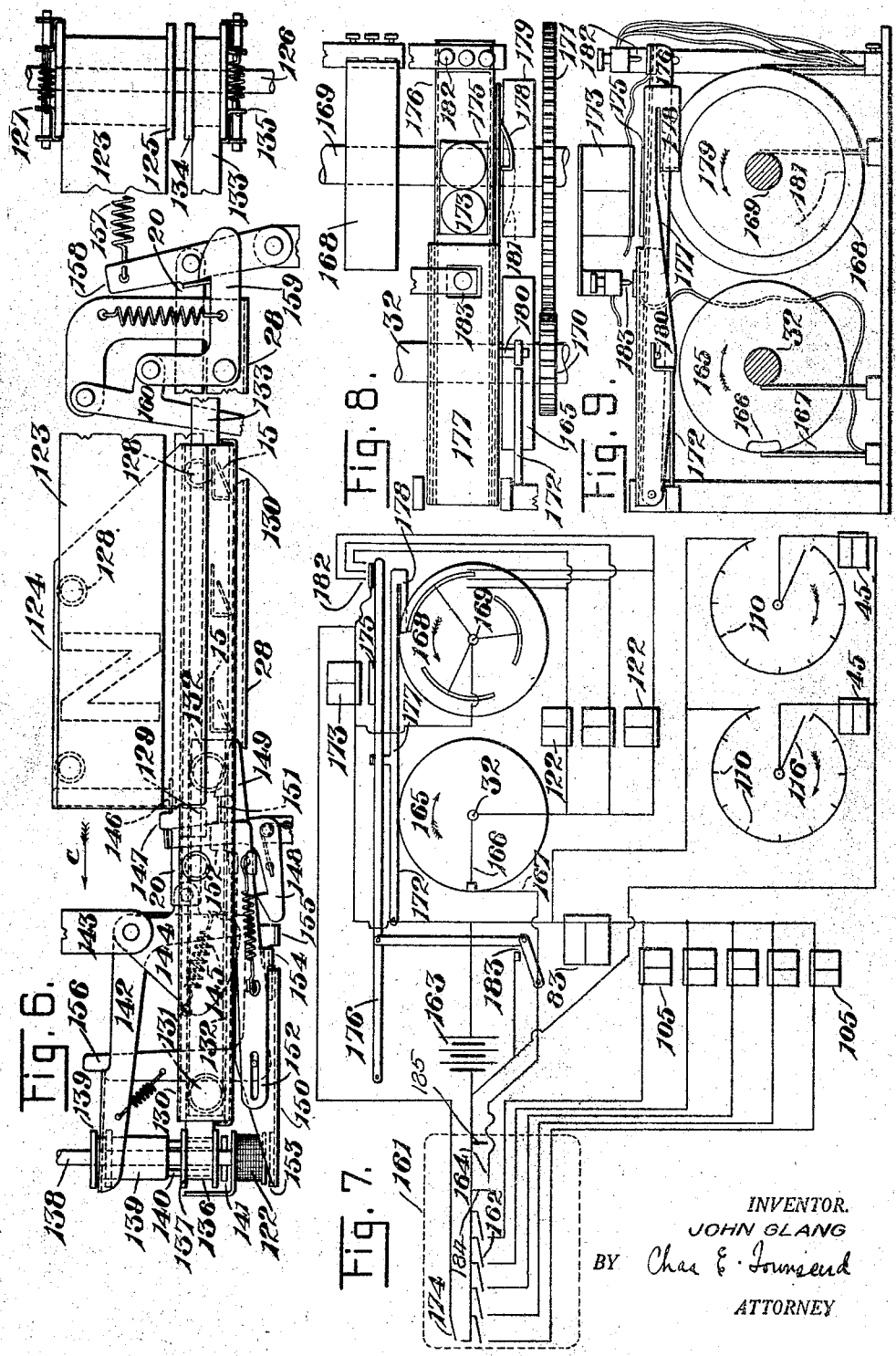

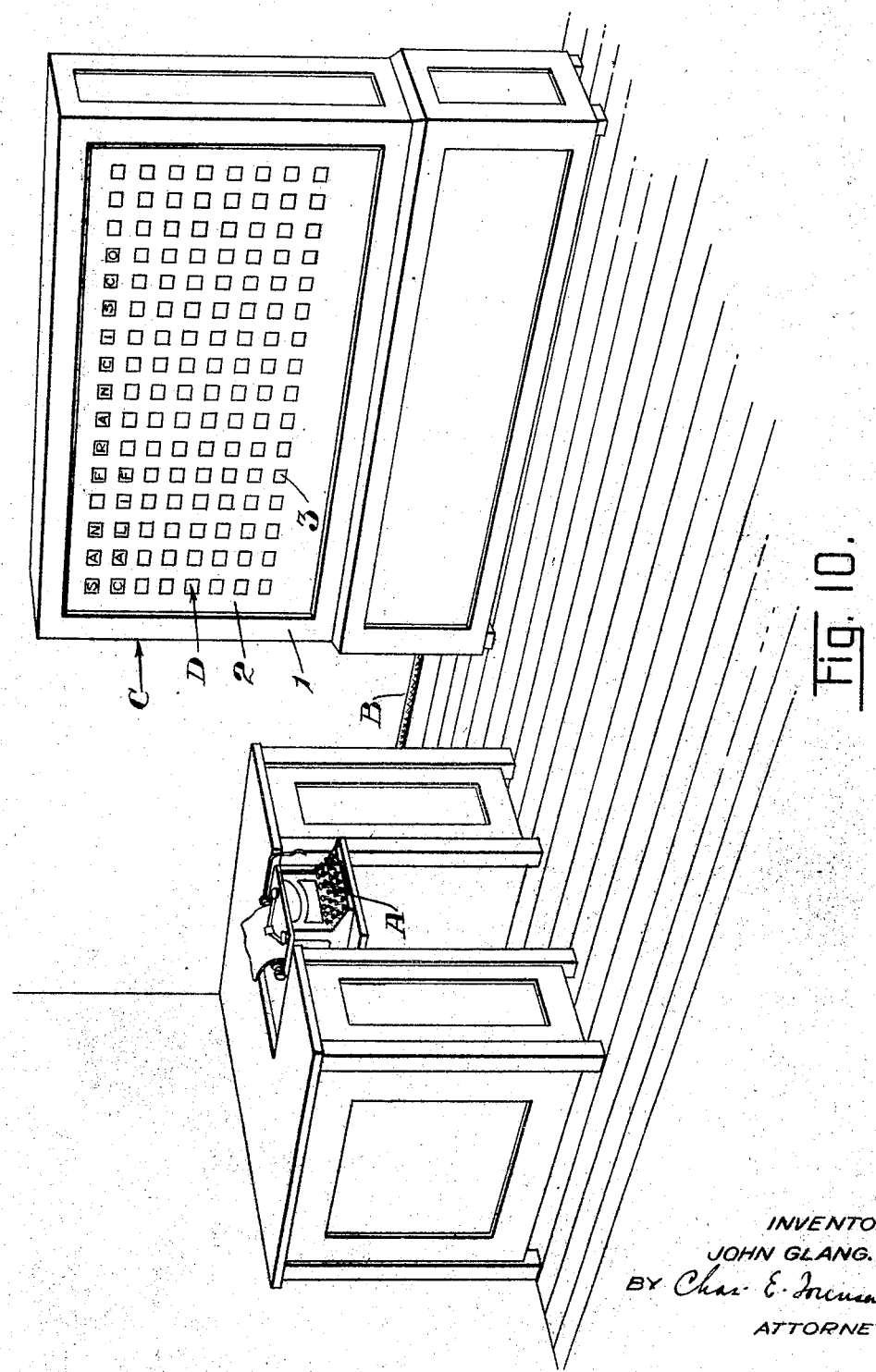

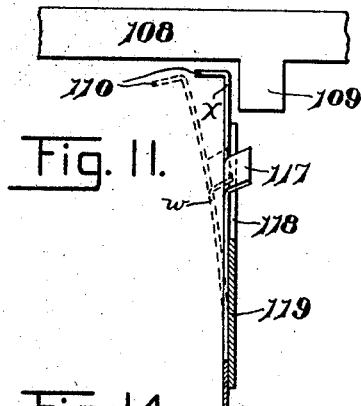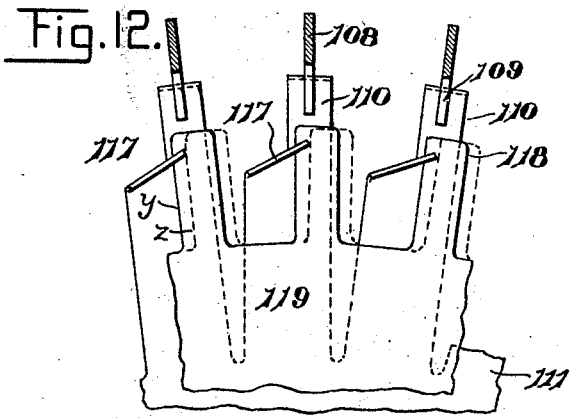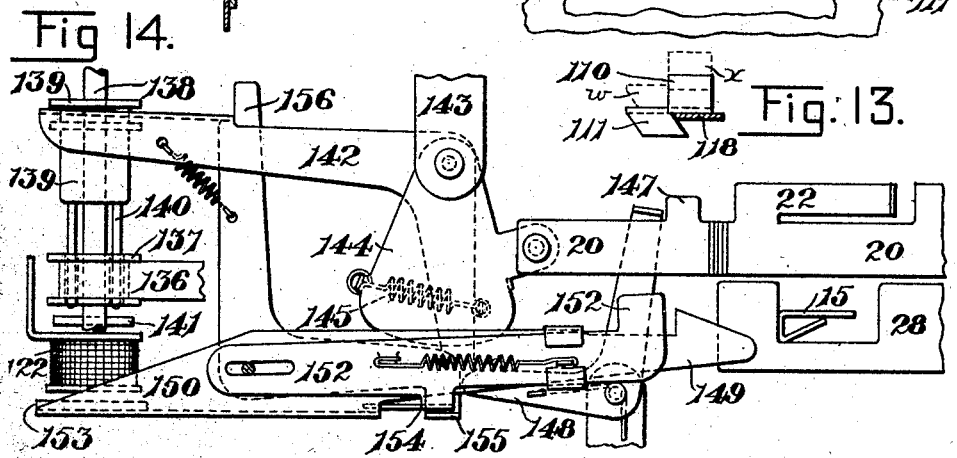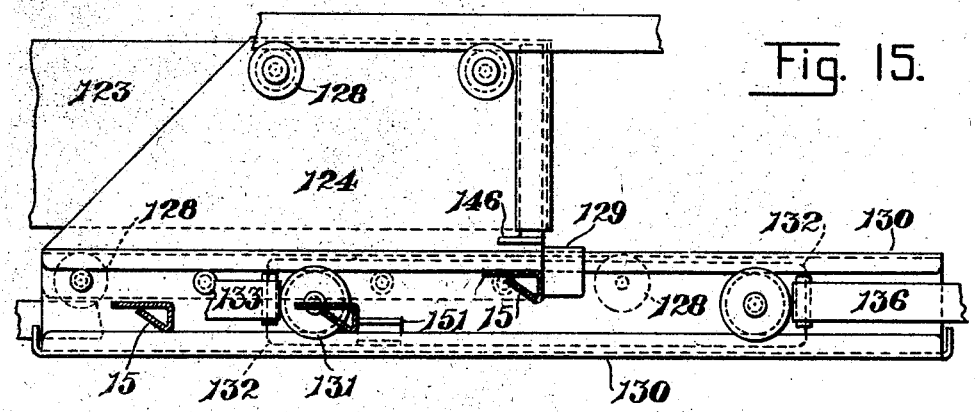

Patented Aug. 4, 1925.

1,548,264

UNITED STATES PATENT OFFICE.

JOHN GLANG, OF MILL VALLEY, CALIFORNIA, ASSIGNOR OF ONE-HALF TO EDWARD O. HERMANN, OF MILL VALLEY, CALIFORNIA.

DISPLAY DEVICE.

Application filed February 16, 1921. Serial No. 445,281.

*To all whom it may concern:*

Be it known that I, JOHN GLANG, a citizen of the United States, residing at Mill Valley, in the county of Marin and State of California, have invented new and useful Improvements in a Display Device, of which the following is a specification.

This invention relates to a display device, and particularly pertains to an advertising or bulletin board.

It is the principal object of the present invention to provide a display device embodying the use of a bulletin board upon which a succession of characters may be caused to optionally and selectively appear, as controlled by a keyboard, disposed at a remote point, said device making it possible for words, sentences, designs, or other legends to be arranged in legible fashion upon the display board, and to be automatically removed from view when so desired, the mechanism comprising a plurality of duplicate units to be successively operated and optionally controlled.

The present invention contemplates the use of a typewriter keyboard, electrically connected to a plurality of duplicate display units arranged in successive lines and assembled to form a bulletin board, each of said units embodying a character ribbon upon which a succession of characters are formed, and which characters may be optionally presented to view as controlled by the depression of one of the keys on the keyboard.

The invention is illustrated by way of example in the accompanying drawings, in which:

Figure 6 is a view in front elevation, showing the line operating mechanism.

Fig. 7 is a view in diagram, indicating the key controlled circuits and means for automatically shifting the lines.

Fig. 8 is a top view in plan, showing the mechanism of the blank magnet, and the automatic line shifting mechanism.

Fig. 9 is a view in side elevation of the details shown in Fig. 8.

Fig. 10 is a view in perspective showing one application of the present invention.

Fig. 11 is an enlarged fragmentary view in section and side elevation showing the operation of the selective mechanism disk.

Fig. 12 is an enlarged fragmentary view in side elevation showing the relative movement of certain elements of the selective operating mechanism.

Fig. 13 is an enlarged view in transverse section through the fingers of the selective mechanism to show their relative positions.

Fig. 14 is an enlarged fragmentary view in elevation showing details of the line operating mechanism.

Fig. 15 is an enlarged fragmentary view in rear elevation showing details of the line operating mechanism.

Broadly considered, the present invention embodies the use of a keyboard A, connected by a cable B to a display board C, said board being equipped with a plurality of character units D, by which various characters, symbols, letters and designs may be caused to optionally appear upon the board. The board is made with a frame 1, carrying a glass 2, which glass or screen is formed with a plurality of rectangular openings 3. These openings are spaced equi-distant in horizontal lines, and a plurality of said lines of openings may be formed throughout the height of the screen.

Figure 2:
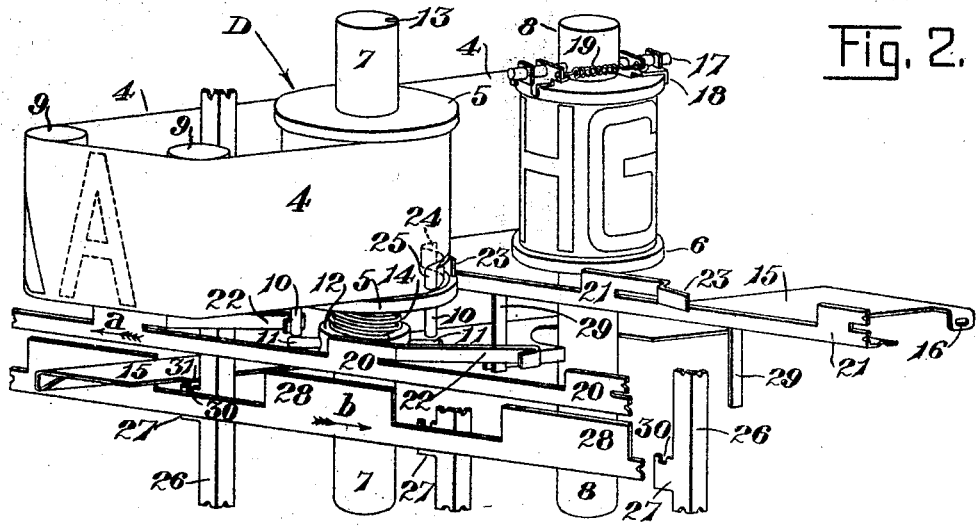
Fig. 2 is a view in perspective showing the ribbon arrangement of one of the character units.

The openings 3 are formed to disclose character ribbons 4, one of which ribbons is provided for each of the openings, and all of the ribbons being preferably formed with a duplicate series of identical characters. Referring particularly to Fig. 2, it will be noted that the opposite ends of a character ribbon are fastened around drums 5 and 6. Drum 5 is disposed near the front of the machine, while drum 6 is arranged parallel thereto, and in a vertical plane directly in the rear of drum 5. The forward drum is freely mounted upon a vertical shaft 7, while the rear drum is similarly mounted upon a rear vertical shaft 8. It will thus be evident that by suitable mechanism the ribbon 4 may be readily wound off of one drum and onto the other, thus making it possible to display any character on the ribbon through one of the openings 3 in the screen. In order to hold the displayed portion of the ribbon flat, and to stretch it across the display opening, a pair of rollers 9 is provided around which rollers the ribbon must pass from one drum to the other.

The drum 5 may be driven through a plurality of downwardly projecting pins 10, which are secured to the lower face of the drum, and may be engaged by horizontal driving pins 11. These pins extend radially from a clutch washer 12, which is splined to the shaft 7 by a key engaging the keyway 13. The radial pins 11 are normally held out of engagement with the drum pins 10 by an expansion spring 14, which circumscribes the shaft 7 and is interposed between the washer 12 and the drum 5. This action causes the washer to positively rest upon a rearwardly and horizontally extending clutch plate 15, pivoted in the rear of the machine at 16. As hereinafter described the pins 10 are also used as stops for drum 5, and if one turn of ribbon 4 around the drum is divided into four spaces for four characters it will be necessary to provide four pins 10 in order to stop the drum at four different positions 90 degrees apart.

By a mechanism to be hereinafter explained, the vertical front shafts 7 may be successively and intermittently set in motion. These shafts 7 are driven anticlockwise and when the washer 12 of one drum is moved to its engaging position as lifted by the clutch plate 15, shaft 7 will cause drum 5 to rotate and ribbon 4 to be wound onto the drum 5 and off of the drum 6. At the same time all of the rear shafts 8 will be continuously driven anticlockwise.

Driving connection between the rear shafts 8 and the drums 6 is brought about by radial pins secured to the shaft, as indicated at 17, and upon which pins friction shoes 18 are slidably held. These shoes have down-turned fingers, which are yieldably secured against the periphery of the drum 6 by springs 19. However when the front drum 5 is out of engagement with the clutch washer 12, the friction shoe will act to wind the ribbon 4 upon the drum 6 until the drum 5 is locked by a stop mechanism.

The stop mechanism for locking the drum 5 consists of two independent stop plates 20 and 21, which are disposed upon opposite sides of the shaft 7, and adjacent to the lower ends of the drums 5. Front stop plate 20 is movable longitudinally, and is formed with spring pawls 22, which are disposed in the same horizontal plane with the vertical drum pins 10. These pawls and pins are so arranged that in rotation of drum 5, pins 10 will encounter a pawl from the flat side, and shift same out of the way. When, however, the front drum is disconnected from the shaft 7 and is driven by the movement of shaft 8, one of the pins 10 encounters the end of pawl 22, and is prevented from further rotation, thus holding the ribbon against the frictional driving action of the shoes 18, and causing a desired character to continuously appear in the plane between the rolls 9 and in view through one of the display openings 3. When a plate 20 is moved in the direction of the arrow —a—, it will free all of the front drums, and permit the ribbons to be wound upon the rear drums until the ribbon has moved to its blank position.

The stop plates 21 are auxiliary to the plates 20, and act to secure all of the drums in their blank position. This is done by means of fingers 23, which are struck from the auxiliary plates 21, and which may be brought to register with a notch 24 in the circumference of the drums 5. This notch is, of course, usually covered by the ribbon wound on the drum, and is not engaged by the finger 23 until near the end of the ribbon where it is possible for the finger to pass through a cut 25 along the marginal edge of the ribbon as shown in Fig. 2.

The drums 5 may be set in motion as previously described by the initial raising action of clutch plates 15. These plates are lifted by vertical lift rods 26, one of which is provided for each vertical row of character units D. The lower ends of the lift rods are actuated by a mechanism to be described, and when moved longitudinally in an upward direction, will cause their outwardly extending tangs 27 to engage the clutch plate 15. Attention is here directed to the fact that the pivotal mounting of the clutch plate 15, as indicated at 16, is slotted, so that these plates may have slight lateral movement thereof. This is brought about by a guide plate 28, which extends parallel to and beneath the stop plate 20. This guide plate is cut away at intervals throughout its length, to accommodate the transversely extending plates 15. The clutch plates 15 are pressed against shoulders of the guide plate 28 by the action of leaf springs 29, carried upon the stop plate 21. Normally the plates 28 are held in their extreme left hand positions, as indicated by arrow $a$ and in a manner to allow the tang 27 of lift rod 26 to move upwardly without engaging the clutch plate. By a selective operating mechanism to be hereinafter described, the guide plate of any desired line may be moved from its normal position in the direction indicated by the arrow —b— in Fig. 2, at which time the edges of the various clutch plates therealong will move into the path of vertical travel of the tangs 27 on the lift rods 26. In order to insure positive engagement of the tangs with the clutch plates, it may be desirable to form the tangs with notches 30, into which projections 31 of the clutch plates may extend. By this arrangement the clutch plates will be held in engagement with the tangs, after the guide bar has moved to its original position.

Reciprocation of the lift rods 26 is brought about by a positive drive mechanism, comprising a lower cam shaft 32, and an upper cam shaft 33. (See Fig. 3). The lower cam shaft is provided with lift cams 34, this shaft being so timed that it will cause the various cams to successively perform their lifting action once in each revolution. In the present instance this would mean that there are 12 cams with their lifts disposed 30 degrees apart around the shaft, as there are 12 character units employed in each row of the display board disclosed in the accompanying drawings. The cams 35 hereinafter designated as release cams, are arranged so that they will operate every 60 degrees and the shaft 33 carrying them is designed to rotate at twice the speed of the shaft 32.

The various lifting cams 34 are designed to gradually raise lifting levers 36. Each of these levers has a downwardly tapered face against the bottom of which the cams may wipe in swinging the levers on their rear pivots. The forward ends of these levers extend through slotted openings in the lift rods 26, and are connected with the lower ends of the lift rods by springs 37, through which springs, lifting motion is imparted to the rods.

Figure 3:
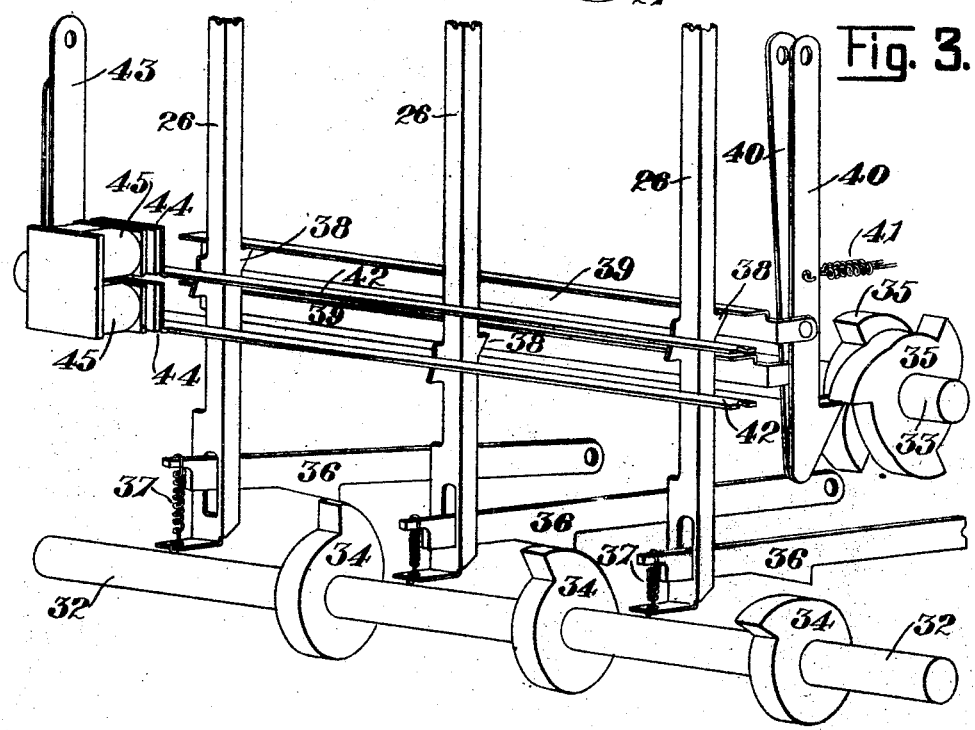
Fig. 3 is a view in perspective showing the operating mechanism by which the ribbon units are controlled, this figure being complementary to Figure 2.

The rods 26 are normally held against upward movement due to projections 38 thereon, which encounter release bars 39. Two of these bars are shown in Fig. 3 as being superposed and parallel to each other. Release levers 40 are pivotally suspended from the frame of the machine and carry the bars. These levers are normally held out of the path of travel of the projections 38, by springs 41, which cause their lower tapered ends to rest against the release cams 35. These cams act to instantaneously permit springs 41 to draw the levers 40 toward the cam shaft 33 and the release bars 39 out of the path of travel of the projections 38. This action is accomplished by an electrical operation, which will be hereinafter disclosed. In order to insure that the release bars 39 will swing in a parallel movement, they are supported at their opposite ends by the levers 40, and are actuated by pairs of cams, disposed at the opposite ends of the release shaft 33. The two release bars are designed to alternately control the movement of the lift rods.

When a lift rod is raised to engage the unit mechanism of a desired character unit, it is held in its uppermost position by horizontal retaining bars 42, which are suspended on links 43. During this time the front drum 5 of the unit will continue to revolve until the retaining bars are released from beneath projections on the rods 26, and permit the rods to fall. Manipulation of the retaining bars 42 is brought about by providing armatures 44, adapted to be influenced by magnets 45, which will draw the bars from their retaining positions as they swing on the links 43. This insures that the front spools 5 may be stopped to display any desired character by providing means for establishing an electric circuit through the releasing magnet 45, which circuit will be automatically formed after shaft 7 has completed a desired number of revolutions.

Figure 1:
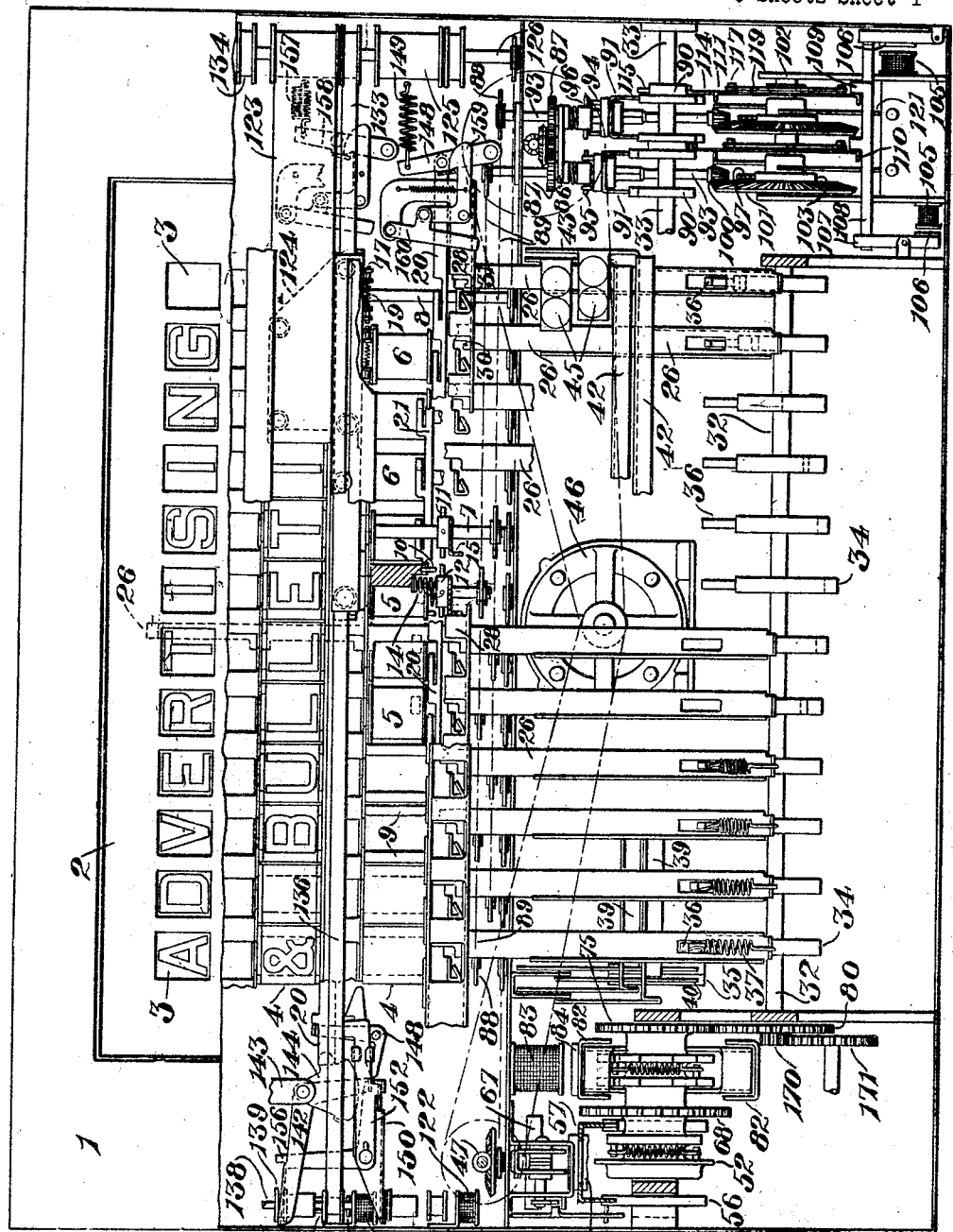
Figure 1 is a view in vertical section and elevation, showing the complete machine with parts broken away to more clearly disclose the operating mechanism thereof.
Figures 4, 5:
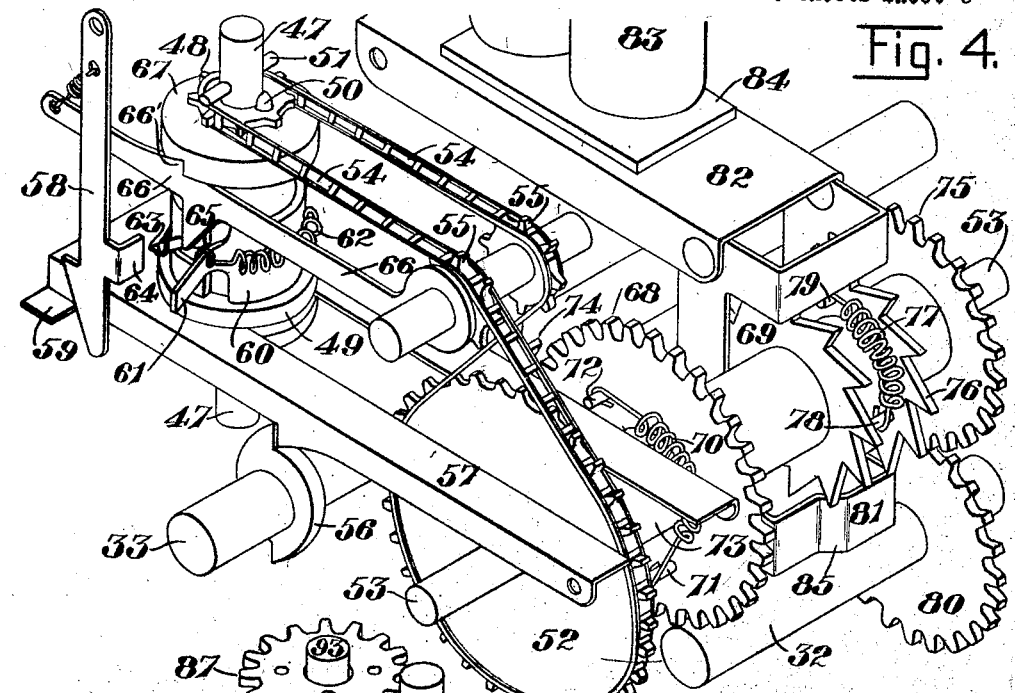
Fig. 4 is a view in perspective showing the cam operating means.
Fig. 5 is a view in perspective showing the selective means for controlling the movement of the character ribbons and for the sake of convenience in drawing accommodations but 12 characters have been shown in this figure.

Reference being had to Figs. 4 and 1, the driving mechanism for cam shafts 32 and 33 may be examined. These shafts are indirectly driven by a motor 46, which is geared in a suitable manner to a cam drive shaft 47. This shaft rotates continuously and carries a sprocket wheel 48, loosely mounted thereon. This shaft may be operatively connected with the sprocket wheel by means of a raising clutch sleeve 49, carrying a pin 50, which passes through an opening in the sprocket and engages a driving pin 51, carried by the shaft. A chain passes around the sprocket 48, and is led around an enlarged sprocket wheel 52 on a stationary shaft 53. This chain is indicated at 54, and is shown as passing over idler sprockets 55. In the present instance it is desired that a gear ratio of four to one will be established between the sprocket 48 and the sprocket 52.

In order to raise clutch sleeve 49 and to thus cause the chain 54 to be driven, cam shaft 33 is provided with lifting cams 56, which have a swell upon their opposite sides and engage a tapered face on the bottom of the lever 57. The clutch sleeve is formed with tapered grooves for receiving the yoke-shaped lever 57, and by which lever the sleeve may be moved. The lever 57 may be locked in its uppermost position by a catch 58, which will swing under a projection 59 at the end of the lever. The clutch sleeve carries a loosely mounted sleeve 60 thereon, formed with a trip pin 61 pulled around the sleeve by a spring 62, as limited by a stop pin 63 extending radially from sleeve 49. The pin 61 may engage an extension 64 on the catch 58 to release the lever 57. This occurs near the completion of the rotation of sprocket wheel 48, at which time pin 61 is temporarily prevented from touching extension 64 by engagement with a projection 65 on a vertically swinging cam lever 66. When the revolution of the sprocket 48 is complete, an extension 66' on the lever 66 will be lifted into a notch of a cam disc 67 as influenced by a tension spring secured to the end of the lever 66, and will allow the pin 61 to swing free, striking the extension 64. This will permit lever plate 57 and the sleeve 49 to drop, thereby disengaging the sprocket 48. Due to the fact that the gear ratio between sprocket 48 and 52 is four to one, sprocket 52 well move a quarter of a revolution each time the lever 57 is raised to cause operative engagement of the sprocket wheel.

The sprocket wheel 52 is fitted with spur gears 68 and 75 and escapement wheels 69 and 76, by which the cam shafts 32 and 33 are driven. The gear 68 receives motion from sprocket 52, through a coil spring 70 secured at one end to a pin 71 on sprocket 52 and by its opposite end to a pin 72 on gear 68. This spring extends around the hub 73 of the sprocket, while the spur gear 68 is in mesh with a gear 74, carried on the cam shaft 33. The escapement wheel 69 is secured rigidly upon the same hub with gear 68, while gear 75 is driven through an escapement wheel 76, yieldably connected to the wheel 69 by a spring 77, secured at one end to a pin 78 on the wheel 69 and by the opposite end to a pin 79 on the wheel 76. Through this mechanism gear 80 of the cam shaft 32 is driven.

The escapement wheels are normally locked by a plate 81, carried at the end of a lever 82. The escapement member operates against the square faces of the escapement teeth upon both sides of the wheels. A suitable magnet is provided as indicated at 83, to influence armature 84 on lever 82, and to lift the lever with the lock plate 81. When the lock plate is raised the upper teeth of the escapement wheels will be disengaged, at the same time causing the lower portion of the lock plate to engage the lower teeth of the wheel. When the circuit for the magnet 83 is broken lock plate 81 will drop releasing the lower teeth of wheels 69 and 76 and engaging the upper teeth next to those previously engaged. The escapement wheels are provided with 12 teeth agreeing with the number of character units in a line on the bulletin board. Thus every complete operation of magnet 83 to raise and lower lock plate 81 will cause both escapement wheels 69 and 76 to complete a movement of 30 degrees.

If desired, the lower portion of the plate 81 may be formed with an offset 85 making the distance from the lower teeth of wheels 69 and 76, which are to be engaged by plate 81, to the edge of this plate, about 5 and 25 degrees respectively.

The character selecting mechanism may be understood by reference to Figures 1, 5, 11, 12 and 13. In this connection it will be understood that shafts 7 for driving the front drums 5 are rotated by motor 46, which is geared to a drive shaft 86 operating gears 87, sprocket wheels 88 and chains 89. The sprocket wheels 88 are located in two horizontal planes and are operated by two chains 89 connecting alternate wheels, thus alternate shafts 7 will be in separate groups each of the two clutches driven by separate chains, making it possible for successive character units to be set in motion without waiting for the preceding unit to cease operation. As hereinafter explained, at the moment of pressing a key on the keyboard for displaying a character on the bulletin board, one of the chains 89 will be automatically connected to the motor and remain in motion until the shafts 7 driven by this chain have completed a definite number of revolutions, say ten, after which the chain will be automatically disconnected from the motor. This number of revolutions depends on the number of characters on ribbon 4. Thus, with 36 characters on the ribbon, four characters for each turn around drum 5, nine revolutions of shafts 7 are required to move the last character to opening 3, and an additional revolution is provided to allow sufficient time for disconnecting chain 89.

The number of chains 89 depends on the desired speed for operating the machine. Thus, if motor 46 is geared so that shafts 7 will complete 2½ revolutions per second, each series of shafts will require 4 seconds for the ten revolutions assumed in the preceding paragraph. Since in the present arrangement the chain operating the first shaft also operates the third, fifth and so on, while the intermediate shafts are driven by another chain, it will be evident that the second character unit in a line may be operated before the chain driving the shaft for the first character unit has been disconnected, and that after four seconds, the third character unit may be operated. Thus with the above assumption, the average time required to display a character will be two seconds. With a given speed of motor 46, the average operating speed of the machine will always be in direct proportion to the number of chains 89 or groups of shafts 7. It will now be understood why lift rods 26 are also divided into two series or groups, one release bar 39 and one retaining bar 42 being provided for one series of lift rods and another set of bars 39 and 42 for the second series. The same duplication of parts is necessary for the selective mechanism shown in Fig. 5. Cam shaft 33 is provided with two pairs of cams 90, one pair for each group of shafts. For each letter contact made by the keyboard, a lever plate 91, carrying sleeve 92 is raised by one of the cams 90. Sleeve 92 is splined onto shaft 93, and when this sleeve is raised its pin 94 will engage a horizontal pin 95 on a collar 96. This collar rotates continuously with shaft 86, and when pin 94 is engaged by pin 95 sleeve 92 and shaft 93 will also be set in motion to operate one of the sprocket chains 89. Gear 87 and collar 96 are loosely mounted on shaft 93, and may be rigid or yieldable against vertical movement.

When cam 90 raises the lever plate 91 to engage one of the sprocket chains 89, it is supported by a bent lever 97. This bent lever will be withdrawn from the edge of the lever plate 91 near the end of movement of chain 89 by means to be hereinafter described. Since the parts operating the bent lever 97 move very slowly as compared to wheels 88 and sleeves 92 a second support is provided, comprising a hook 98, extending beneath the lever 91, and catching a projection 99 thereon when the lever 97 is withdrawn. Since this second support 98 is operated by sleeve 92 it will disconnect the sprocket chain with more precision than bent lever 97.

The lower end of each shaft 93 carries a pinion 100, which is in mesh with a bevel gear 101. This gear is rotatably mounted on a stationary shaft 102, and completes one revolution for each 10 revolutions of the shafts 93 and 7, provided shafts 7 require about 9 revolutions to move ribbon to last character thereon, an additional revolution being allowed for disconnecting the mechanism. Bevel gear 101 carries a cam 103 which during the last 10th of its revolution, lifts the bent lever 97, relieving it from its support of the lever 91, at which time this lever rests upon the hook 98. At the end of the 10th revolution of shaft 93, pin 104 on sleeve 92 will strike an extension of hook 98, and swing it to allow the lever 91 to drop. This action will disconnect the particular series of front shafts 7.

Selection of letters or other characters carried on the ribbons is made by pressing the keys of a typewriter or other keyboard, which will form an electric circuit through character magnets 105. These magnets may be arranged in a circle around shaft 102. Armatures 106 are fixed on levers 107 and when influenced by magnets 105, will draw the horizontal bars 108 sideways. There are separate bars 108 for each character on the keyboard, and each bar is fitted with a projection 109 for each series or groups of shafts 7 in the machine. Thus, for a machine having character ribbons with 36 characters, there are required 36 magnets 105, 36 levers 107 and 36 bars 108, and with the present arrangement embodying the use of two chains 89 and two series of shafts 7, two projections 109 will be necessary on each bar 108. Projections 109 engage arms 110, extending radially from a plate 111, mounted on the stationary shaft 102. The plate 111 is of spring metal and is located so that the projections 109 will pass between its arms 110 without bending the same. Springs 112 are provided to pull the plates 111 against pins 113, which are secured to the stationary shaft 102. The spring plate 111 has an extension 114 projecting toward the cam shaft 33 and is slightly pressed back by a pin 115, when this particular series is in operation, thus bringing the arms 110 of the series in line with the projections 109. It is noted that the ends of the arm 110 are bent at right angles and extend toward the gear 101, forming contact pieces for a brush 116, rotated by gear 101 (see Figs. 11, 12 and 13). Each arm 110 also has a projection 117 bent so as to form an acute angle with the circumference of a circle passing through the face of the bent portions. These projections 117 extend between arms 118 of a plate 119. This plate is mounted on the stationary shaft 102, and adjacent to the spring plate 111, to which it is connected by a spring 120. Whenever the armature 106 pushes one of the bars 108 against an arm 110, deflecting the same toward the brush 116, to the dotted line position W in Figs. 11 and 13 the projection 117 will be caught by arm 118, which will prevent arm 110 from returning to its normal position X. The contact brush 116 when touching deflected arm 110 closes a circuit through magnet 45, the current passing through brush 121. The brush 116 is so set that in revolving around the shaft 102, it will pass the first arm 110, when the first character on the ribbon 4 has just passed the opening 3, it will pass the next arm 110 when the second character on the ribbon has passed opening 3, and so on. Drum 5 and ribbon 4 of the unit engaged will remain in motion until brush 116 encounters an arm 110 and will be stopped the moment magnet 45 operating the retaining bar 42 causes lift rod 26 to drop. The character disclosed in opening 3 will therefore always correspond to the key pressed on the keyboard, the magnet 105 connected to this key and the arm 110 deflected by this magnet.

It is to be understood that gear 101 and brush 116 continue to rotate until cam 103 lifts the bent lever 97, thus allowing plate 91 to slightly drop and rest on hook 98 only. At the end of the tenth revolution of shaft 93, hook 98 will be pushed to the right by pin 104, and plate 91 with sleeve 92 will drop entirely. Pin 94 will thereby become disengaged from pin 95 and shaft 93 as well as all shafts 7 in the series operated by it will stop moving.

An extension 97' of bent lever 97 may be connected to the plate 119 and be raised simultaneously with the cam extension of bent lever 97. This movement rotates plate 119 so that its arms 118 move from the full line position *y* in Fig. 12 to the dotted line position *z*, releasing projection 117 and allowing arm 110 to return to its normal position as shown particularly in Figs. 11 and B in full lines at *x*.

It will be understood that an inscription or legend may be caused to appear in any line of the display board by shifting a guide plate 28 to the right and bringing the edges of clutch plates 15 over the tangs 27 of the lift rods 26. It is also desirable to conceal the character ribbons during the operation and until the desired character has come to rest in the back of its opening 3, and furthermore, to provide means for disengaging all of the mechanisms in a line, at the completion thereof, and to restore the entire line to blank space. The release of these mechanisms, as shown in Fig. 6, is effected by a line operating magnet 122, which may be operated manually or automatically, and one of which is provided for each line. An additional blank strip 123 is also provided for each line, the left hand end of which is secured to a sliding carriage 124, while the opposite end is fastened to a spool 125 on a shaft 126. The spool 125 is rotated in a similar manner as drum 6, the shaft 126 continuously rotating anti-clockwise and carrying pins with friction shoes 127 which will press against rim of spool 125, rotating same and pulling the strip 123 to the right as far as the position of the carriage 124 will permit. This carriage is fitted with rollers 128, disposed between guide plates on the frame of the machine.

Before any characters are disclosed in openings 3 of a line, carriage 124 is located to the extreme left of the line and held there by parts hereinafter described, until a current passes through line magnet 122, the strip 123 passing in front of rollers 9 and covering all ribbons 4 of this line. Carriage 124 is equipped with guide 130 for rollers 131 of an inside carriage 132. Guide 130 has bends at both ends, the left hand bend bearing against rear end of inside carriage 132 which when held in place will also prevent outside carriage 124 from proceeding. Inside carriage 132 is pulled toward the right by strip 133, spool 134 and friction shoes 135, in a similar manner as carriage 124, spools 125 and 134 being on the same shaft 126 which is continuously rotating. Before this particular line is used for disclosing any characters, a stop 151 on inside carriage 132 is held by a hook 149 of lever 150 which carries an armature 153. The action of magnet 122 lowers hook 149 and releases stop 151. Strip 133 will now pull inside carriage 132 a short distance toward the right until stop 151 encounters the front end of one of the clutch plates 15 which are normally located in the path of stop 151.

When the first clutch plate 15 is raised to engage the first character unit, the path of stop 151 is cleared for a further distance, and when the following plates 15 are raised, the inside carriage will always proceed to the last character unit engaged. Carriage 124 is also equipped with a stop 129 which is in line with the clutch plates 15, when they are in their raised positions, and will not proceed to the right until the clutch plate drops, thereby allowing the carriage 124 and the concealing strip 123 to disclose the letter which has been set for view in the space 3.

The movement of the carriage 124, relative to the carriage 132 is two letter spaces in a machine with two series of shafts, its movement being limited by the length of guide 130. Carriage 124 will proceed until the left hand bent portion of the guide 130 touches the rear end of carriage 132, but not before those clutch plates which are raised permitting stop 151 of carriage 132 to pass, have dropped. The left hand end of carriage 132 is connected by a strip 136 to a spool 137, which spool is freely mounted on a shaft 138, and may be connected therewith by a sleeve 139, having vertical pins 140, passing through the spool 137, and coming in contact with horizontal pins 141 on the shaft. The sleeve 139 is carried by the fork-shaped end of a bent lever 142. This lever is pivoted at 143 together with a lever 144, which lever is fastened to the front stop plate 20, while the levers 144 and 142 are connected by spring 145.

When the spool 137 is operatively connected to shaft 138, it will pull both of the carriages in the direction of the arrow —*c*—, covering the ribbons 4 in back of openings 3 in that particular line. Near the end of the movement of the carriages a projection 146 on the carriage 124 engages a projection 147 on the stop plate 20, moving the plate and the lever 144 against the action of the spring 145. The bent lever 142 is held against movement by a hook a bent lever 148, engaging the vertical arm of the lever. At the end of the movement of the carriages, projection 147 moves the vertical arm of the lever 148 to release lever 142, permitting spring 145 to lift the sleeve 139, and disengage it from pin 141. The carriage will then be slightly pulled back, until the hook 149 of a lever 150 engages stop 151 on the inside carriage. The mechanism will then be disposed as shown in Fig. 6, and will be in condition for a subsequent operation.

The stop 151 presses against a plate 152 sliding in lever 150, which carries an armature 153. When the carriages are not in their extreme left hand position, the flange 154 of plate 152 is located directly above the flange 155 of bent lever 156, as shown in Fig. 14. When magnet 122 is then energized it will raise the armature 153 and lower the flange 154 which will engage flange 155 and press the vertical arm of lever 156 to the right. As this lever was supporting lever 142, this action of the magnet will cause lever 142 and sleeve 139 to drop and spool 137 to be connected to shaft 138, causing the movement of carriages 124 and 132 in the direction of arrow c, described in the preceding paragraph. As shown in Fig. 6, flange 154 is located to the left of the path of flange 155, and when the line magnet 122 is energized at the beginning of the operation of the line, bent lever 142 and sleeve 139 will remain supported by the lever 156, the only effect of the movement of the lever 150 being that the hook 149 will release the stop 151, both carriages now being moved toward the right by spools 125 and 134, as limited by plates 15. The release of the stop 151 also permits stop plate 20 and guide plate 28 to move to the right, bringing pawls 22 in position to engage pins 10 and placing the edges of plates 15 above rod tangs 27. The movement of these plates is effected by spring 157, fixed at one end and secured to a lever 158. Plate 20 is secured directly to lever 158, while guide plate 28 is temporarily connected thereto by a bent lever 159. When the last clutch plate 15 in the line is raised, the stop 151 will press against a lever 160, connected to the member 159, thus disconnecting plate 28 from lever 158, so that the springs 29 will push the guide plate of this line toward the left. The stop plate 20 will remain in position until line magnet 122 is energized to "clear" the line, at which time the flange 154 of the plate 152 is located above the flange 155 of the supporting lever 156, the vertical arm of which moves to the right, permitting the horizontal arm of lever 142 and sleeve 139 to drop, and connect spool 137 to the shaft 138. The strip 136 will now pull the carriages 124 and 132 to the left, while strip 123 will cover the characters displayed in the line. The slanting flanges of the front edge of clutch plate 15 will allow stop 151 to pass under them without lifting the washers 12, to produce a clutch action. At the end of the movement of the carriages, plate 20 will be pressed toward the left to stretch the spring 157, at which time the lever 158 will catch the hook 159, placing both plates ready for the next operation. The wiring arrangement is substantially disclosed in Fig. 7, and may be described as follows: The keyboard 161 is provided with a plurality of character keys 162, adapted to close the various circuits of character magnets 105, which members operate the contact arms 110. A return conductor from a source of electrical energy 163 includes the main magnet 83, by which the mechanism of cam shafts 32 and 33 is operated. The carriage 164 of the typewriter, when moved to the left for a new line, against contact point 184 closes one of the line magnet circuits 122, producing the result previously described.

The automatic line shifting is accomplished by the following mechanism: The cam shaft 32 will complete one revolution for each line, and carries a disc 165, having a commutator segment 166, located to make contact with the brush 167 when the last letter is reached. This will allow the circuit to be completely closed by the carriage 164. Successive line magnets 122 will be included in this circuit by automatic contacts made by disc 168, mounted on shaft 169, geared to and rotated by shaft 32. The gear ratio of the shafts is such that the disc 168 will complete one revolution when letter spaces of all lines of the machine are covered. Thus in a machine with three lines of character units, disk 168 will complete one revolution while disk 165 completes three revolutions. Disk 168 has three commutator segments, only one of which is in contact with a brush connected to one of the three line magnets 122. To provide the required blank spaces, sufficiently in advance, and to eliminate the pressing of separate keys, an additional contact brush 172 is provided for disc 165, closing the circuit for the line magnet, shortly before the line is required, the current passing through contact point 185 and carriage 164.

To change the entire sign to blank spaces and to temporarily eliminate the automatic line reversing operation, brush 172 may be lifted off of the disc 165 by a magnet 173, which is operated by a switch key 174, and attracts an armature 175 on a lever 176. This lever lifts a member 177 so that its spring flange 178 will rest on the edge of the cam disc 179, and remain there, after lever 176 falls. Lever 177 is also equipped with an insulating pin 180 to raise brush 172, and hold the same until space for additional reading matter is required. By this time the cut 181 in the disc 179 will have advanced to drop lever 177, and to bring brush 172 into contact with the disc 165. When the contact is made for the blank magnet 173, lever 176 will close the circuit for all or any desired number of line magnets 122, by means of contacts 182 and 183, thus changing all of the lines to the blank spaces.

The effect of the various contacts can best be understood from a description of the operations which may be summed up as follows: The machine is made ready for use by starting motor 46 which will continuously rotate the rear shafts 8, the drive shafts 47 and 86 and the line operating shafts 126 and 138. When it is intended to display any characters on the bulletin board, carriage 164 of the typewriter is first moved to the left against contact point 184. The commutator segment 166 is then in contact with brush 167, and the first of the three commutator segments on disk 168 is in contact with the brush connected to the first line magnet 122. The current, therefore, passes from battery 163 through the contact point 184, carriage 164, brush 167, segment 166, the first line magnet 122, the first brush and segment on disk 168, and the return wire, to the battery 163. This will release the carriages 124 and 132 of the first line and allow guide plate 28 and plate 20 to be pulled toward the right by spring 157 and lever 158, bring clutch plates 15 of this line over the tangs 27 of the lift rods 26 and moving the pawls 22 in the path of pins 10.

If a character key 162 is now pressed down, representing, say, the fifth character "E" on the ribbon 4, the current will pass through the fifth character magnet 105, (counting from the position of the brush 116 and in the direction of its movement), which will bend the fifth arm 110 of one of the plates 111 to contact position $w$, the current also passing through the main magnet 83.

Through the mechanism shown in Fig. 4, magnet 83 will cause shafts 32 and 33 to complete movements of 30 and 60 degrees, respectively, raising the first lift rod 26, which in turn will lift the clutch plate 15 in the first character unit and connect the drum 5 of this unit to shaft 7. Shaft 33 will also lift one of the two plates 91, Fig. 5, connecting one of the shafts 93 to the drive shaft 86 and causing the first series of shafts 7, as well as the contact brush 116 of this series, to rotate.

When the drum 5 of the first unit has completed about 1¼ revolutions, the fifth character "E" on the ribbon having just passed opening 3, the brush 116 will have moved to the fifth arm 110 and close a separate circuit for one of the two serial magnets 45. This will operate retaining bar 42 and cause the lift rod 26 and clutch plate 15 to drop and drum 5 to become disconnected from the shaft 7, so that drum 6 will pull the ribbon 4 slightly back until one of the four pins 10 is stopped by the pawl 22 and the letter "E" on ribbon 4 is thereby centered in opening 3. The plate 15 will release stop 129 (Fig. 6) and carriage 124 will move sufficiently to the right to disclose the character displayed in the first opening 3.

Shafts 7 of this series will rotate until gear 101 has completed one revolution. Cam 103 will then release the deflected arm 110 and the plate 91, and pin 104 will disconnect this series of shafts 7.

When a second key 162 is pressed down, arms 110 of the second plate 111 will be located in the path of projections 109, and the second series of shafts 7 will be connected to the motor by the second plate 91, the shaft 33 having rotated 60 degrees since the first key 162 was pressed down. The cams 34 and 35 will now cause the second lift rod 26 to be raised, and the desired character will be displayed in the second character unit. Here, as in all succeeding contacts made by keys 162, the circuit closed thereby directly is that for one of the character magnets 105 and the main magnet 83, the latter starting the mechanical movements necessary for bringing the desired character to the opening 3, while the contact for magnet 45 will be formed automatically by brush 116 at the moment when the desired character on ribbon 4 has reached opening 3.

If the two key operations described above are of the same key, i. e., in both cases, the key representing the letter E, it will be evident, that the first and second display openings 3 will now show the letter E. In both cases, the same character magnet 105 and bar 108 have been operated, bending the fifth arm 110 of both plates 111 to contact position, so that brush 116 will have travelled the same distance when closing the circuit for serial magnets 45, which will disconnect ribbon 4 and drum 5 from shaft 7 with the letter E in the display opening in both cases. Assuming for explanatory reasons that only this one key representing the letter E is being depressed a number of times, it will be seen, that the movement of the ribbon 4 will be terminated after each of the shafts 7 and drums 5 have completed 1¼ revolutions, the disconnection being effected by the contact of brush 116 with corresponding contact arms 110. Twelve depressions of this key will cause the current to pass twelve times through the main magnet 83, turning shaft 32, 360°, the cams 34 of which will successively operate on lift rods 26, so that the letter E will appear in all twelve display openings of the first line, the thirteenth key depression will again raise the first lift rod 26. However, the line operating mechanism described above has moved all clutch plates 15 of the first line out of the path of projections 27 of the lift rods 26 and moved those of the second line into engaging position, so that letter E will now be produced on the first display space of the second line.

It will be remembered that after every group of three keys 162 depressed to form the above mentioned contacts, cam 56 (Fig. 4) will cause the sprocket wheel 48 to complete one revolution and stretch springs 70 and 77 sufficiently for rotating shafts 32 and 33 during the three following operations of keys 162.

Since the cams 34 are disposed 30 degrees apart, the operation will be shifted automatically to the next unit to the right, until the twelfth unit has been connected. Then the first cam 34 to the left will again be in position to raise the first lift rod 26. Carriages 124 and 132 of the first line have traveled to the extreme right, and stop 151 will press against lever 160, disconnecting the guide plate 28 from the lever 158 so that clutch plates 15 of the line will be pushed toward the left by springs 29.

All revolving parts are now located as when operations began, with the exception of disks 168 and 179 which have only traveled 120 degrees. When the carriage 164 is again moved to the left to start line two, the circuit closed thereby will pass through the second segment of disk 168, and, therefore, the line magnet 122 for the second line will now be energized, causing the carriages 124 and 132 and the plates 20, 28 and 15 to be released for the operation of this line.

The circuits of the automatic line reversing mechanism are closed as follows: Before any reading matter is on the bulletin board, the flange 178 of the member 177 is resting on the disk 179 and holds the brush 172 out of contact with the disk 165. However, when about half of the character units have been operated, or at the time of connecting the units in the middle of line two, disks 168 and 179 will have completed one half a revolution, and cut 181 will allow the flange 178 to drop and the brush 172 to rest on the disk 165. When starting the third line, the disk 165 is, of course, located as shown in Figs. 7 and 9, whereas the disk 168 has rotated 240 degrees, the segment for the third line magnet being in contact with its brush so that the carriage 164, when pushed to the left against point 184, will close the usual circuit for the line magnet 122 to release the carriages 124 and 132 and the plates 20, 28 and 15. However, after the three contacts for line three have been made, the segment 166 has shifted to the brush 172, and the segment for the magnet 122 of line one is again in contact with its brush. At this time, the conducting part of the carriage 164 touches the contact point 185, causing the magnet 122 of line one to be energized for the second time since the machine was started.

The mechanism for this line is now located as shown in Fig. 14, with the flange 154 above 155. Consequently, the action of the magnet 122 of line one will cause the lever arm 156 to move to the right and allow the sleeve 139 to drop and to connect the spool 137 to shaft 138. Strip 136 will pull the carriages 124 and 132 to the left, the blank strip 123 covering the characters displayed in this line.

Projection 146 on carriage 124 will press against the projection 147 on the plate 20, the pawls 22 of which will thereby be withdrawn from the pins 10, so that the shafts 8 will pull all the ribbons 4 of line one back until the fingers 23 engage the notch 24, uncovered by the cut 25 in the margin of the ribbon 4. Plate 20 will press the lever 144 to the left, stretching the spring 145, connected to lever 142 which is held by the hook 148. The projection 147 will finally press against the hook 148, which will allow the spring 145 to raise the horizontal arm of the lever 142 and the sleeve 139, disconnecting the spool 137 from the shaft 138. The carriages will thus be brought to a stop and be held by the hook 149, engaging the projection 151.

Simultaneously with disconnecting the motor 46, the switch key 174 may close the circuit for the blank magnet 173. This will lift the lever 176 and close the contacts 182 and 183 so that the current passes through all the line magnets 122, restoring all the lines to the blank spaces.

It will thus be seen that the apparatus here disclosed will effectively operate to provide means for displaying a succession of characters in a succession of lines, insuring that these characters may appear in a semi-automatic manner, and thereafter be eliminated from view at the will of the operator.

While I have shown the preferred form of my invention as now known to me, it will be understood that various changes in the combination, construction, and arrangement of parts, may be made by those skilled in the art, without departing from the spirit of the invention, as claimed.

Having thus described my invention, what I claim and desire to secure by Letters Patent, is:

1. In the display unit of a changeable character display board, a movable character ribbon with approximately equally spaced characters thereon, a rotatably mounted carrying and operating member for said ribbon, a fixed number of characters on each turn of said ribbon around said carrying member, and a stop device including elements depending from said carrying member.

2. In the display unit of a changeable character display board, a movable character ribbon, a rotatably mounted drum governing the movement of said ribbon, and a stop device, including elements depending from said drum dividing the movement of said ribbon into approximately equal spaces.

3. In the display unit of a changeable character display board, a movable character ribbon, a rotatably mounted member carrying and moving said ribbon, a stop device including elements depending from said rotatably mounted member dividing the movement of said ribbon into approximately equal spaces, and a series of characters on said ribbon, one on each of the spaces marked by said stops.

4. A display device comprising a plurality of character units, each unit having a movable display member with characters thereon, character centering stops on said member, a selecting apparatus for automatically operating said display members to cause a selected character thereof to be displayed, and a unit shifting mechanism for grouping the characters.

5. A display device comprising a plurality of character units, each unit having a movable display member with characters thereon, character centering stops on said member, a selecting apparatus for automatically operating said display members to cause a selected character thereof to be displayed, a unit shifting mechanism for grouping the characters, and a line shifting mechanism for automatically causing the characters selected and grouped to appear in lines.

6. A display device comprising a plurality of character units, each unit having a movable display member with characters thereon, character centering stops on said member, a selecting apparatus for automatically operating said display members to cause a selected character thereof to be displayed, a unit shifting mechanism for grouping the characters, a line shifting mechanism for automatically causing the characters selected and grouped to appear in lines, and a blank restoring device for automatically restoring all of said character units to a non-displaying position when desired.

7. A display device comprising a plurality of character units, each unit having a movable display member with characters thereon, character centering stops on said member, a selecting apparatus for automatically operating said display members to cause a selected character thereof to be displayed, a line shifting mechanism for automatically causing the characters selected and grouped to appear in lines, and a front cover for automatically concealing the movement of the character units while in operation.

8. A display device comprising a plurality of character units, each unit having a movable display member with characters thereon, character centering stops on said member, a selecting apparatus for automatically operating said display members to cause a selected character thereof to be displayed, a unit shifting mechanism for grouping the characters, a line shifting mechanism for automatically causing the characters selected and grouped to appear in lines, and a front covering for automatically concealing the characters being displayed in a group of units until the group has been completely formed.

9. A display unit of a changeable character display board comprising a movable character ribbon, two rotatably mounted drums to which the two ends of said ribbons are attached, stops on one of said drums corresponding in number to the number of characters on each turn of said ribbon around said drums, a front space for displaying one of the characters at a time, and a pair of rollers adjacent to said display space on opposite sides of said stops causing said ribbon to form a flat surface at the display space.

10. In a display device, a character unit comprising a pair of drums, adapted to receive a ribbon, throughout the length of which a series of different characters are disposed, supporting rollers over which the drum may roll in a manner to disclose one of the characters on a plane surface, a frictional connection tending to continuously roll the ribbon onto one of said drums, an optionally controlled operating connection to overcome said action, and causing the ribbon to be wound onto the other of said drums, and stops for centering a desired character on said plane surface.

11. In a display device, a character unit comprising a pair of drums, adapted to receive a ribbon, and throughout the length of which a series of different characters are disposed, supporting rollers over which the ribbon may roll in a manner to disclose one of the characters on a plane surface, a frictional connection tending to continuously roll the ribbon onto one of said drums, an optionally controlled operating connection to overcome said action, and causing the ribbon to be wound onto the other of said drums, stops for centering a desired character on said plane surface, and a mechanism for automatically breaking said operating connection, causing the ribbon to be brought to rest with a selected character display.

12. In the display unit of a changeable character display board, movable parts including a character ribbon, stops on said movable parts having a fixed location relative to the position of the characters on said ribbon, a display space disclosing one of said characters at a time, stationary stops having a fixed location relative to said display space, and a character selecting mechanism causing the engagement of a movable stop with a stationary stop, thereby determining the character displayed.

13. A changeable character display board comprising a plurality of display units, each unit containing movable parts including a character ribbon, stops on said movable parts having a fixed location relative to any one character on the ribbons of all of the display units, a display space in each unit disclosing one of said characters at a time, stationary stops having a fixed location relative to said display space, a character selecting mechanism causing the engagement of a movable stop with a stationary stop, thereby determining the character displayed, and a shifting mechanism whereby the various units will be successively connected to said character selecting mechanism.

14. In the display unit of a changeable character display board, a character ribbon normally held in non-display position, an operating drum for moving said ribbon to display any desired character, a combined rewinding and slack adjusting mechanism tending to move said ribbon in the opposite direction as far as the position of said operating drum will permit, ratchet stops in said drum for centering the displayed character in a display space by engaging a stop pawl, a release mechanism for withdrawing said pawl and allowing said rewinding mechanism to move the ribbon into initial or non-display position, and an auxiliary stop pawl for holding the ribbon in initial position by passing through an aperture in said ribbon and engaging a recess in the said drum.

15. A display device comprising a board having rows of display openings through the face thereof, movable display units, one supplied for each of the openings in the board, said units carrying duplicate sets of characters to be displayed, a mechanism for selecting a character on a unit to be displayed and moving the character to a display position relative to the corresponding opening in the board, an automatic unit shifting mechanism for consecutively operating the units to disclose desired characters, and an automatically operating line shifting mechanism for causing the characters to appear in successive rows of openings as the machine is operated.

16. In a display device, a row of character units having a pair of parallel shafts driven in opposite directions, pairs of drums, one of which is freely mounted on each of the shafts in each unit, a friction shoe for producing yieldable frictional engagement of one drum with its shaft, and a clutch for producing positive engagement of the other drum with its shaft, to act through a ribbon wound on the two drums and to overcome the frictional engagement of the first named drum.

17. In a display device, a row of character units having a pair of parallel shafts driven in opposite directions, pairs of drums, one of which is freely mounted on each of the shafts in each unit, a friction shoe for producing yieldable frictional engagement of one drum with its shaft, a clutch for producing positive engagement of the other drum with its shaft, to act through a ribbon wound on the two drums and to overcome the frictional engagement of the first named drum, a plurality of control members for operating said clutch, causing said ribbon to pass over a display space, and an automatic disconnecting mechanism actuated by the control members operated to discontinue the positive driving action in a manner to disclose a character described.

18. A changeable character display board comprising a plurality of display units arranged in vertical and horizontal lines, a movable display member in each unit having a series of characters thereon, an operating shaft for each vertical row of units, moving said display members to display any desired character thereof, a subdivision of said shafts to any desired number of series, an independent connecting and disconnecting mechanism for each series, and an automatic shifting mechanism causing the various series of the shafts to be operated in rotation.

19. A changeable character display board comprising a plurality of display units arranged in horizontal and vertical lines, a movable display member in each unit having a series of characters thereon, a motor, an operating shaft for each vertical row of units, for moving said display members to display position, a subdivision of said shafts into any desired number of series, an independent driving connection between said motor and each series of operating shafts, an automatic series shifting mechanism for successively connecting the various series of shafts to said motor and an automatic unit shifting mechanism for successively connecting the display members of the various units to said operating shafts.

20. In a changeable character display board of the key-board operated type, a plurality of display units, each unit having a display space, a movable display member with characters thereon, and stops on said display member dividing the movement thereof into steps of the length of a character space, a driving mechanism for moving said display members and causing all characters thereon to pass over the display space until the desired character has reached the display space, a release mechanism for said driving mechanism operated by the depression of a key, and a character selecting mechanism set by the same key depression to cause the termination of the movement of said display member at one of said stops.

21. A changeable character display board comprising a plurality of duplicate display units arranged in horizontal and vertical lines, a movable display member in each unit carrying a series of characters thereon, a key-board operated character selecting mechanism common to all of said units for moving said display members to display any desired character thereof, duplicate horizontal members for each horizontal line of display units, duplicate vertical members for each vertical line, and a unit determining mechanism operating a horizontal and a vertical member at a time, the intersection of said members determining the unit connected to the selecting mechanism.

22. A changeable character display board comprising a plurality of duplicate display units arranged in horizontal and vertical lines, a movable display member in each unit carrying a series of characters thereon, a keyboard operated character selecting mechanism common to all of said units, for moving said display members to display any desired character thereof, duplicate horizontal members for each horizontal line of display units, duplicate vertical members for each vertical line, a unit determining mechanism operating a horizontal and a vertical member at a time, the intersection of said members determining the unit connected to said selecting mechanism and an automatic shifting arrangement for said unit determining mechanism.

23. A changeable character display board comprising a plurality of display units, a movable display member in each unit, a series of characters on each display member, a motor for moving any desired character to display position in any of said units, an energy storing mechanism interposed between said motor and display members, a release mechanism operated automatically by every movement of the character forming key-bars, and a re-energizing mechanism to said motor after a predetermined number of key-bar operations, and also automatically disconnecting it therefrom.

24. A changeable character display board comprising a plurality of display units arranged in horizontal and vertical lines, a movable display member in each unit having a series of characters thereon, a character selecting mechanism for moving the desired character in each display unit to display position, an automatic unit shifting mechanism for successively connecting said selecting mechanism to the various display members of a horizontal line of units, and an automatic double acting line shifting and blank restoring mechanism, arranged to shift the connection of said selecting mechanism to the next blank line of units, causing the unit shifting mechanism to successively connect the units of this line to said selecting mechanism and, on the other hand, to restore any horizontal line to blank spaces in case any characters are in display in this line at the time of operation.

25. In a changeable character display board, a plurality of display units arranged in horizontal and vertical lines, a character selecting mechanism for all of said units, a front covering strip for each horizontal line, a line operating mechanism for connecting any desired line to the selecting mechanism, a release mechanism for said strip identical with said line selecting mechanism, allowing the strip to disclose only those units that have been connected to and disconnected from the character selecting mechanism, a front covering strip reversing mechanism, and a blank restoring mechanism released by said front covering strip after having completely covered all units of a line.

26. In a display device, a plurality of pairs of vertical shafts, the shafts of each pair rotating in opposite directions, a plurality of drums freely mounted on the shafts and held against vertical movement and disposed in horizontal rows, character ribbons secured by their opposite ends to complementary drums of each pair of shafts, and adapted to be wound by the driving action of the shafts from one drum to the other, friction shoes continuously acting to produce driving engagements between the drums of one shaft of each pair, and selectively controlled clutches for producing positive driving engagement of the drums of the other shafts with their shafts.

27. In a display device a plurality of pairs of vertical shafts, the shafts of each pair rotating in opposite direction, a plurality of drums freely mounted on the shafts and held against vertical movement, and disposed in horizontal rows, character ribbons secured by their opposite ends to complementary drums of each pair of shafts and adapted to be wound by the driving action of the shafts from one drum to the other, friction shoes continuously acting to produce driving engagements between the drums of one shaft of each pair, and selectively controlled clutches for producing positive driving engagement of the drums of the other shafts with their shafts, and a plurality of control members which may be single operated to cause the positive engagement of one of said drums with its shaft.

28. A display device comprising a plurality of oppositely rotating pairs of vertical shafts, a plurality of drums held in spaced relation to each other and freely mounted throughout the lengths of said shafts, character ribbons, the opposite ends of which are secured to complementary drums on the shafts of each pair, said drums being arranged in horizontal rows, frictional connections constantly tending to produce driving engagement between one of the shafts of each pair and its drums, positive connections for optionally producing positive driving engagement of one of the other shafts with a drum thereon, a plurality of control members for establishing said action, and an automatic disconnecting mechanism effected thereby by which said action will be discontinued to display a character on the ribbon agreeing with the control member actuated.

29. A display device comprising a plurality of oppositely rotating pairs of vertical shafts, a plurality of drums held in spaced relation to each other and freely mounted throughout the lengths of said shafts, a character ribbon, the opposite ends of which are secured to complementary drums on the shafts of each pair, said drums being arranged in horizontal rows, frictional connections constantly tending to produce said driving engagement between one of the shafts of each pair and its drum, positive connections for optionally producing positive driving engagement of one of the other shafts with a drum thereon, a plurality of control members for establishing said action, an automatic disconnecting mechanism effected thereby by which said action will be discontinued to display a character on the ribbon agreeing with the control member actuated, and a unit shifting mechanism whereby successive operation of any one of said control members will produce the desired successive operation of the character ribbons across the row of the display device.

30. A display device comprising a plurality of oppositely rotating pairs of vertical shafts, a plurality of drums held in spaced relation to each other and freely mounted throughout the lengths of said shafts, character ribbons, the opposite ends of which are secured to complementary drums on the shafts of each pair, said drums being arranged in horizontal rows, frictional connections constantly tending to produce driving engagement between one of the shafts of each pair and its drums, positive connections for optionally producing positive driving engagement of one of the other shafts with a drum thereon, a plurality of control members for establishing said action, an automatic disconnecting mechanism effected thereby by which said action will be discontinued to display a character on the ribbon agreeing with the control member actuated, a unit shifting mechanism whereby successive operation of any one of said control members will be accompanied by the desired operation of successive character ribbons in a line, and a line shifting mechanism for automatically causing this action to take place throughout the several rows of the device.

31. A display device comprising a board having rows of display openings through the face thereof, movable display units one supplied for each of the openings in the board, said units carrying duplicate sets of characters to be displayed, means for selecting a character on a unit to be displayed and moving the character to a display position relative to the corresponding opening in the board, means for consecutively operating the units to disclose desired characters, and automatically operating means for causing the characters to appear in successive rows of openings as the machine is operated.

32. A display device comprising a plurality of character units, each unit being capable of selectively displaying one of its characters, means for automatically operating said units to cause a selected character thereof to be displayed, means for grouping the characters, means for automatically causing the characters selected and grouped to appear in lines, and means for automatically concealing the characters being displayed in a line until the line has been completely formed.

33. In a display device a pair of parallel shafts continuously driven in opposite directions, a pair of drums, one of which is freely mounted on each of the shafts, means for producing yieldable frictional engagement of one drum with its shaft, and means for producing positive engagement of the other drum with its shaft, to act through a ribbon wound on the two drums and to overcome the frictional engagement of the first-named drum.

34. In a display device a pair of shafts rotating in opposite directions, and disposed parallel to each other, drums, one of which is freely mounted on each of said shafts, a character ribbon, the ends of which are secured to the drums so that the action of the shafts will wind the ribbon from drum to drum, means for yieldably establishing frictional engagement of one roll with its shaft, and optionally controlled means for positively establishing engagement of the other roll with its shaft to overcome the frictional engagement of the other roll with its shaft.

35. In a display device character unit comprising a pair of shafts rotating in opposite directions, and disposed parallel to each other, drums, one of which is freely mounted on each of said shafts, a character ribbon, the ends of which are secured to the drums so that the action of the shafts will wind the ribbon from drum to drum, means for yieldably establishing frictional engagement of one roll with its shaft, and a plurality of control means, the actuation of any one of which will cause positive engagement of the other roll with its shaft to overcome the frictional driving action of the first named roll and to wind the character ribbon thereon, and automatic means actuated by the control means operated to discontinue the positive driving action in a manner to display a character described.

36. In a display device a plurality of pairs of vertical shafts, the shafts of each pair, rotating in opposite directions, a plurality of drums, freely mounted on the shafts, and held against vertical movement, and disposed in horizontal rows, character ribbons, secured by their opposite ends to complementary drums of each pair of shafts, and adapted to be wound by the driving action of the shafts from one drum to the other, means continuously acting to produce driving engagements between the drums of one shaft of each pair, and selectively controlled means for producing positive driving engagement of the drums of the other shafts with their shafts.

37. In a display device a plurality of pairs of vertical shafts, the shafts of each pair, rotating in opposite directions, a plurality of drums, freely mounted on the shafts and held against vertical movement, and disposed in horizontal rows, character ribbons, secured by their opposite ends to complementary drums of each pair of shafts, and adapted to be wound by the driving action of the shafts from one drum to the other, means continuously acting to produce driving engagements between the drums of one shaft of each pair, and selectively controlled means for producing positive driving engagement of the drums of the other shafts with their shafts, and a plurality of control means, which may be singly operated to cause the positive engagement of one of said drums with its shaft.

38. A display device comprising a plurality of oppositely rotating pairs of vertical shafts, a plurality of drums held in spaced relation to each other and freely mounted throughout the lengths of said shafts, character ribbons, the opposite ends of which are secured to complementary drums on the shafts of each pair, said drums being arranged in horizontal rows, means constantly tending to produce driving engagement between one of the shafts of each pair and its drums, positive means for optionally producing positive driving engagement of one of the other shafts with a drum thereon, a plurality of control means for establishing said action, and automatic means effected thereby by which said action will be discontinued to display a character on the ribbon agreeing with the control means actuated.

39. A display device comprising a plurality of oppositely rotating pairs of vertical shafts, a plurality of drums held in spaced relation to each other and freely mounted throughout the lengths of said shafts, character ribbons, the opposite ends of which are secured to complementary drums on the shafts of each pair, said drums being arranged in horizontal rows, means constantly tending to produce driving engagement between one of the shafts of each pair and its drums, positive means for optionally producing positive driving engagement of one of the other shafts with a drum thereon, a plurality of control means for establishing said action, automatic means effected thereby by which said action will be discontinued to display a character on the ribbon agreeing with the control means actuated, and means whereby successive operation of one of said control members will produce the desired successive operation of the character ribbons across the row of the display device.

40. A display device comprising a plurality of oppositely rotating pairs of vertical shafts, a plurality of drums held in spaced relation to each other and freely mounted throughout the lengths of said shafts, character ribbons, the opposite ends of which are secured to complementary drums on the shafts of each pair, said drums being arranged in horizontal rows, means constantly tending to produce driving engagement between one of the shafts of each pair and its drums, positive means for optionally producing positive driving engagement of one of the other shafts with a drum thereon, a plurality of control means for establishing said action, automatic means effected thereby by which said action will be discontinued to display a character on the ribbon agreeing with the control means actuated, and means whereby successive operation of any one of said control members will be accompanied by the desired operation of successive character ribbons in a line, and means for automatically causing this action to take place throughout the several rows of the device.

41. In a display device a character unit, comprising a movable character ribbon, throughout the length of which a series of different characters are disposed, an operating drum to which one end of character ribbon is attached, rewinding or slack adjusting means attached to other end of character ribbon, ratchet stops in ribbon operating means, dividing movement of ribbon into spaces of the length of a character space on ribbon, means for centering displayed character identical with said stops, and an auxiliary stop for holding ribbon in initial position by passing through aperture in character ribbon and engaging notch in operating drum.

JOHN GLANG.